(12) United States Patent
Tobey et al.

(10) Patent No.: US 12,168,333 B2
(45) Date of Patent: Dec. 17, 2024

(54) APPARATUS AND METHOD FOR SEPARATING SUBSTANCES OF DIFFERENT FLOWABILITY THAT ARE MIXED TOGETHER

(71) Applicants: NORDISCHER MASCHINENBAU RUD. BAADER GMBH + CO. KG, Lübeck (DE); LINDE GMBH, Pullach (DE)

(72) Inventors: Andreas Tobey, Lübeck (DE); Pia Meinlschmidt, Lübeck (DE); Joachim Härtlein, Lübeck (DE); Michael Fuchs, Lübeck (DE); Friedemann Hanf, Lübeck (DE); Laszlo Dolezsaj, Hamburg (DE)

(73) Assignees: NORDISCHER MASCHINENBAU RUD. BAADER GMBH + CO. KG, Lübeck (DE); LINDE GMBH, Pullach (DE)

( * ) Notice: Subject to any disclaimer, the term of this patent is extended or adjusted under 35 U.S.C. 154(b) by 0 days.

(21) Appl. No.: 18/016,529

(22) PCT Filed: Jul. 14, 2021

(86) PCT No.: PCT/EP2021/069645
§ 371 (c)(1),
(2) Date: Jan. 17, 2023

(87) PCT Pub. No.: WO2022/013305
PCT Pub. Date: Jan. 20, 2022

(65) Prior Publication Data
US 2023/0286241 A1    Sep. 14, 2023

(30) Foreign Application Priority Data
Jul. 15, 2020  (DE) .......................... 102020118720.3

(51) Int. Cl.
B30B 15/34    (2006.01)
A22C 17/04    (2006.01)
B30B 9/24     (2006.01)

(52) U.S. Cl.
CPC .............. B30B 15/34 (2013.01); A22C 17/04 (2013.01); B30B 9/241 (2013.01)

(58) Field of Classification Search
CPC .......... B30B 15/34; B30B 9/241; A22C 17/04
See application file for complete search history.

(56) References Cited

U.S. PATENT DOCUMENTS 3,368,363 A    2/1968  Alaburda
4,018,389 A    4/1977  Paoli
(Continued)

FOREIGN PATENT DOCUMENTS

AT    284607 B    9/1970
DE    3516623 A1   11/1985
(Continued)

*Primary Examiner* — Joseph C Rodriguez
(74) *Attorney, Agent, or Firm* — Dinsmore & Shohl LLP (57) ABSTRACT

An apparatus configured to separate substances comprising: a frame structure; a hollow drum, wherein the hollow drum is driven in rotation and comprises a perforated circumferential surface and an at least partially open end side; a press belt wrapped around the perforated circumferential surface; a product intake wedge, wherein the product intake wedge guides a product flow into the apparatus; a support apparatus comprising a support element, wherein the support element is located on a side of the press belt opposite the hollow drum; and a device configured to discharge separation material pressed through the perforated circumferential surface, wherein: the separation material is pressed into a hollow space of the hollow drum, the separation material is
(Continued)

pressed from the end side of the hollow drum, and a cooling device cools the separation material with a cryogenic cooling medium.

18 Claims, 4 Drawing Sheets

(56) References Cited

U.S. PATENT DOCUMENTS

| | | | |
|---|---|---|---|
| 4,156,384 A | | 5/1979 | Born |
| 4,637,094 A | | 1/1987 | Matsubayashi |
| 4,889,048 A | * | 12/1989 | Miller .................. D21F 3/0281 |
| | | | 100/153 |
| 5,241,901 A | | 9/1993 | Kunig |
| 9,089,876 B2 | | 7/2015 | Hoppe |
| 11,760,050 B2 | * | 9/2023 | Fuchs ..................... B30B 15/08 |
| | | | 100/37 |
| 11,832,623 B2 | * | 12/2023 | Amersfoort ............ A22C 17/04 |
| 2019/0192999 A1 | * | 6/2019 | Baxter ................. B01D 21/009 |
| 2021/0037837 A1 | * | 2/2021 | Günther ................ A22C 17/04 |
| 2022/0234320 A1 | * | 7/2022 | Schwarz ................ B30B 9/241 |

FOREIGN PATENT DOCUMENTS

| | | |
|---|---|---|
| DE | 4116476 A1 | 11/1992 |
| DE | 4319062 A1 | 12/1994 |
| DE | 102016108200 B3 | 12/2016 |
| EP | 0676144 A1 | 10/1995 |
| JP | 2005169399 A | 6/2005 |
| WO | 2015150433 A1 | 10/2015 |

* cited by examiner

APPARATUS AND METHOD FOR SEPARATING SUBSTANCES OF DIFFERENT FLOWABILITY THAT ARE MIXED TOGETHER

CROSS-REFERENCE TO RELATED APPLICATIONS

This application is the U.S. National Stage of PCT/EP2021/069645 filed on Jul. 14, 2021, which claims priority to German Patent Application 102020118720.3 filed on Jul. 15, 2020, the entire content of both are incorporated herein by reference in their entirety.

FIELD OF THE INVENTION

The invention relates to an apparatus configured and adapted to separate substances of different flowability that are mixed together, comprising a frame structure, a hollow drum which is driven in rotation and mounted on the frame structure and has a perforated circumferential surface and at least one at least partially open end side, an endless press belt driven in rotation which is wrapped around part of the circumferential surface of the hollow drum and can be pressed from outside against the hollow drum, a product intake wedge formed by the press belt and the hollow drum for guiding into the apparatus a product flow consisting of material to be pressed into the space between the hollow drum and the press belt in an inlet region of the product flow, a support apparatus for the press belt with at least one support element which is located on the side of the press belt opposite the hollow drum, and a device for discharging separation material pressed through the perforated circumferential surface into the hollow space of the hollow drum from the at least partially open end side of the hollow drum.

The invention further relates to a method for separating substances of different flowability that are mixed together, comprising the following steps: Feeding a product flow, consisting of material to be pressed, into a product intake wedge which is formed by a hollow drum with a perforated circumferential surface and a press belt which lies against the outside of the hollow drum while wrapping around part of the circumference, driving the hollow drum and/or the press belt in rotation in order to draw the product flow between the hollow drum and the press belt, the easier-flowing constituents of the product flow being pressed by means of the press belt as separation material through the perforation of the circumferential surface of the hollow drum into the hollow space of the hollow drum and being discharged from an at least partially open end side of the hollow drum, while the harder-flowing constituents of the product flow remain outside the circumferential surface of the hollow drum and are discharged separately.

BACKGROUND OF THE INVENTION

Substances, materials or products which differ from each other or whose composition differs in terms of their flow behaviour are amenable to separation within the meaning of the invention. The possibility and/or necessity of separating substances of different flowability mixed together exists in particular in the production of foodstuffs of animal origin (for example, separation of meat from skin, sinews, bones, fishbones etc.), foodstuffs made from fruit and vegetables (for example, separation of fruit flesh from skin, stalks, seeds, stones etc.), and in the processing of incorrectly packaged foodstuffs (for example, separation of butter or cheese from packaging material) and the like. Specific application examples include, for example, coring/pitting of dates or unpacking of cheese slices wrapped in film.

During utilisation, coring or unpacking or any other corresponding separation, a product flow is conveyed from a product feed area with a product intake wedge between the press element, for example the press belt, and the hollow drum, to a product discharge area. The product intake wedge is formed by the arrangement of the press belt relative to the hollow drum and creates an (intake) angle in the inlet region where the product flows into the apparatus. Due to the rotating drive of the hollow drum and/or the rotating drive of the press belt, the product flow is drawn in between the hollow drum and the press belt in the inlet region in the conveying direction F, so that a distance/gap (filled with product flow) is created between the press belt and the hollow drum. Downstream of the product intake wedge (in relation to the conveying direction of the product flow), a pressing area is formed between the press belt and the hollow drum by the wrap-around, through which the product flow is conveyed. The substances of different flowability are separated by pressing the easier-flowing substances, in the example of processing products of animal origin the meat, at least partially as separation material, which in the example of products of animal origin consists of small meat threads or small meat strands, into the hollow drum and discharging them from there. Discharge takes place via an at least partially opened end side of the hollow drum, for example on the front side of the apparatus, it being also possible to define the front side as the rear side. The harder-flowing materials, which again using the example of products of animal origin consist of bones, sinews, skin, etc., are collected and discharged downstream of the hollow drum in relation to the conveying direction F of the product flow in the product discharge area. The portion of the product flow pressed through the perforated circumferential surface M into the interior of the hollow drum, that is to say, into the hollow space, is discharged and led away for further processing. However, the residual product flow not pressed through the perforated circumferential surface M into the interior of the hollow drum, including the harder-flowing constituents, usually adheres at least partially to the outside of the circumferential surface of the hollow drum. This residual flow adhering to the outside of the hollow drum can be loosened, for example, by stripping means.

The product flow is pressed against the perforated circumferential surface of the hollow drum from the outside by means of the press belt or any other press element. Under this pressure, the easier-flowing constituents of the product flow are pressed through the perforations of the circumferential surface as separation material into the inner hollow space of the rotating hollow drum, while the harder-flowing constituents of the product flow remain on the outside on the circumferential surface of the hollow drum and may be discharged in the outlet region downstream of the hollow drum in the conveying direction F. When the product flow is drawn in between the hollow drum and the press belt on the one hand, and during the actual separation process on the other, considerable pressures and a high level of friction occur, thereby heating the product flow and in particular the separation material that has been pressed or squeezed through the perforations. In the food processing industry in particular, when processing fresh products such as meat and fruit, it is especially important to cool the products as continuously as possible or to keep cooling interruptions to a minimum. Up to now, it has been common practice to cool the product to be processed or the product flow before processing and to cool the separation material after processing, that is to say, after it has left the apparatus. However, the product flow may also be fed to the apparatus already preheated. During processing, that is to say, during the separation process inside the apparatus, cooling is interrupted. At any rate, the interruption of the cold chain of the product flow is prolonged with known types of apparatus. Consequently, the separation material is heated, the more so due to the separation process because of the mechanical load. Previously known solutions in which individual components of the apparatus such as the press belt or pressure rollers are cooled are not sufficient to adequately cool the separation material. Direct cooling of the hollow drum, for example, is to be avoided so as not to increase the risk of fracturing the hollow drum.

SUMMARY OF THE INVENTION

The invention is therefore based on the task of proposing a simple and reliable apparatus for gentle separation of substances with different flowability. The task further consists in proposing a corresponding method.

This task is solved by an apparatus of the type mentioned hereinbefore wherein a cooling device is assigned to the hollow drum, the cooling device being configured and adapted to cool the separation material during processing by means of a cryogenic cooling medium. In the context of the invention, during processing means that the separation material is cooled while still in the hollow drum, that is to say, directly and immediately, when it emerges as meat threads or meat strands on the inside from the openings of the perforated circumferential surface of the hollow drum. With this design according to the invention, an apparatus is created for the first time which allows processing and simultaneous cooling of the separation material during processing within the apparatus. In other words, with the apparatus according to the invention it is possible to achieve a continuous cold chain even during the separation process. At least a shortening of the interruption of the cooling chain for the separation material is ensured by the fact that the cryogenic cooling medium acts directly on the separation material during pressing, immediately it arrives in the hollow space. Cryogenic cooling media, in particular liquid cryogens, allow efficient and rapid cooling of the separation material when applied to the surface of the material. Naturally, cryogenic gases can also be used, which liquefy under normal pressure at a critical temperature below room temperature. As the meat to be separated with its narrow meat threads or strands has a very large surface area, the cooling effect is correspondingly high, especially when liquid cryogenic cooling medium is applied. This enables a separation process that is particularly gentle on the product, as the cooling of the separation material already within the apparatus compensates or even overcompensates for heating due to mechanical stress, allowing a previously unattained level of process control and product quality for the separation material.

Advantageously, the cooling device is disposed in the hollow space of the hollow drum and comprises at least one nozzle which is connected to a reservoir of cooling medium via a supply line. On the one hand, this allows for a compact and simple construction. On the other hand, the liquid cryogenic cooling medium can be easily and evenly distributed onto the separation material. The number of nozzles and their positioning in the hollow space may vary. The nozzles are preferably disposed on a support arm or similar which projects into the hollow drum through the at least partially opened end side of the hollow drum so that the rotation of the hollow drum is not impaired. The or each nozzle is connected to the reservoir via a flexible or rigid supply line. However, the or each nozzle can also be held in the hollow space via a then essentially rigid supply line. Suitable containers for storing the liquid cryogens, such as nitrogen, helium, argon, carbon dioxide or similar, can serve as reservoirs, which feed the nozzles with the cooling medium via suitable supply lines.

Preferably, the or each nozzle is directed at least towards the area of the inner surface of the hollow drum which is approximately opposite the area of the product intake wedge and/or the pressing region adjoining it. This ensures significant cooling of the separation material directly at the processing location. Immediately upon or during the formation of the thread-like or strand-like separation material, it is cooled while still in the interior of the hollow drum and can then be discharged in a cooled state.

A preferred further development is characterised in that the or each nozzle is configured as a flat spray nozzle that has a nozzle opening forming a spray fan, such that the cooling medium emerging from the nozzle is applied to the separation material pressed through the circumferential surface in a linear fashion, extending over the entire width of the hollow drum. The or each flat spray nozzle ensures optimum injection of the cooling medium. The line may also be wider, thereby allowing a flat (rectangular) application. The free end of the spray fan has a width that corresponds at least to the width or depth of the inner surface of the hollow drum, so that the spray fan covers every opening on the inside of the perforated circumferential surface over the entire width or depth.

Advantageously, the or each nozzle is assigned a cover which at least partially covers the or each nozzle. The preferably roof-shaped cover on the one hand protects the nozzle or nozzle opening from contamination by material falling from the inner surface of the hollow drum and on the other hand ensures free access of the spray fan to the separation material. However, other constructions for partial shielding of the nozzle can also be used.

Particularly preferably, a device to collect and discharge the cooling medium directed into the hollow space of the hollow drum is assigned to the cooling device. The cryogenic cooling medium meeting the separation material in the liquid phase at least partially evaporates or is transferred into the gaseous phase. The heated or heating cooling medium is therefore extracted and discharged in the form of a gas, aerosol, mist, vapour, fumes or still in liquid droplet form in order to protect the environment and the operator.

The device for collecting the cooling medium preferably comprises at least one cover hood and an exhaust fan connected to the cover hood via exhaust air pipes. According to the principle of, for example, an extractor hood, which is positioned, for example, in front of the open end side of the hollow drum, the "used" cooling medium can be collected and discharged, for example, via an exhaust air pipe, exhaust fan or similar. However, other extraction systems inside or outside the hollow drum can also be used.

Particularly preferably, the or each supply line for supplying the cryogenic cooling medium to the or each nozzle comprises a measuring and/or control section. The measuring and/or control section can be configured within the supply line or replace it at least in sections. By means of the measuring and/or control section, for example the inflow quantity, temperature, inflow speed, etc. of the cooling medium can be monitored and controlled in order to achieve an optimum cooling effect. In other words, a desired temperature can be set for optimum process control and product quality. Optionally, for example, leaks in the supply line can also be monitored and evaluated for control purposes.

In a particularly advantageous embodiment, the cryogenic cooling medium is liquid nitrogen (LIN, also known as $LN_2$). On the one hand, nitrogen is a readily available medium, on the other hand it has a high cooling capacity. Nitrogen is particularly advantageous because it creates an inert atmosphere inside the hollow drum and especially in the area of the surface of the separation material. Naturally, nitrogen can also be used in gas form for cooling. The oxygen ($O_2$) contained in the ambient air no longer reaches the product. This prevents certain chemical reactions from taking place in the separation material, which means that the separation material can be kept fresher. The inert atmosphere also reduces germ growth on and in the separation material.

In a further advantageous embodiment, the cryogenic cooling medium is liquid carbon dioxide (LIC, also known as $LCO_2$). Carbon dioxide is also widely available and has a particularly high cooling effect. Naturally, carbon dioxide can also be used in gas form for cooling. Other cryogenic media can of course also be used.

The device for discharging the separation material expediently comprises a stripping element and/or an ejection screw. In certain embodiments, both components may be provided. Preferably, however, either an ejection screw or a stripping element is provided. However, other means for detaching the separation material from the inner surface and/or for discharging the separation material from the hollow drum can also be used.

Advantageously, the stripping element comprises a product stripping edge and a product guiding surface, the product guiding surface being shaped and/or aligned in such a way that the separation material stripped from the inner surface of the hollow drum by means of the product stripping edge is guided towards the open end side of the hollow drum. The stripping element can, for example, be disposed on a support projecting into the hollow space of the hollow drum. The stripping element is preferably disposed on a cross member that is preferably removably attached to the frame structure in such a way that the stripping element projects into the hollow drum through the at least partially open end side. The stripping element can be formed in a plurality of pieces or in one piece. The separation material discharged from the hollow drum by means of the stripping element or the ejection screw or any other means can, for example, fall onto a preferably cooled trough, chute or any other discharge element and be transported away for further processing.

The task is also solved by a method with the steps mentioned hereinbefore in that the separation material that is pressed through the perforated circumferential surface into the hollow space of the hollow drum is cooled in the hollow drum by means of a cryogenic cooling medium. This not only compensates for the temperature increase due to the mechanical load, but can even further reduce the temperature of the separation material. The preferably liquid cryogenic cooling medium is applied to the separation material and cools it, the cryogenic cooling medium being gradually converted at least partially back into the gaseous phase after application.

Advantageously, the separation material is directly and immediately exposed to the cryogenic cooling medium during the separation process, that is to say, on being pressed through the circumferential surface and/or on being discharged from the hollow drum. Cooling therefore already takes place inside the apparatus as soon as the meat threads or meat strands are pressed through the perforated circumferential surface into the interior of the hollow drum. This means that the cooling medium reaches the separation material at the earliest possible moment.

Particularly advantageously, the cooling medium is applied in a linear fashion over the entire width of the hollow drum to the separation material that has been shredded by the separation process. Flat application, for example in a fan shape or similar, is also possible.

In a preferred variant, the separation material is exposed to nitrogen ($N_2$) as a cryogenic cooling medium.

In another advantageous option, carbon dioxide ($CO_2$) is applied to the separation material as a cryogenic cooling medium.

Advantageously, the desired temperature of the separation material is controlled by supplying the cooling medium to the material. Optimum process control and product quality can be achieved by applying the cooling medium to the separation material and controlling it with regard to, among other things, temperature and/or quantity and/or speed.

A particularly advantageous further development is characterised in that the cooling medium directed into the hollow space of the hollow drum is collected and discharged. Any gases, aerosols, mist, vapour, fumes or even droplets that are produced, that is to say, the entire "unused" cooling medium, can be extracted to protect the environment and in particular the operating personnel.

Preferably, the cooled separation material is stripped from the inner surface of the hollow drum and discharged from the hollow drum.

More particularly preferably, the method is carried out with an apparatus as disclosed herein.

Other advantages resulting from to the aforementioned process steps have already been described in relation to the apparatus, therefore reference is made to the above explanations so as to avoid repetition.

BRIEF DESCRIPTION OF THE DRAWINGS

Further useful and/or advantageous features and further developments of the apparatus and the method can be seen in the description. Particularly preferred embodiments of the apparatus and method are explained in more detail with reference to the attached drawing. The drawing shows the following.

DETAILED DESCRIPTION OF THE INVENTION

The apparatus shown in the drawing is used for separating meat on the one hand and bones, bone residues, sinews, gristle and the like on the other hand and has a plurality of preferred features. Other embodiments having fewer or different features are not explicitly shown. The device can also be used in the same way for separating, for example, fruit flesh from seeds/kernels or for separating any other mixed substances of different flowability.

The apparatus 10 shown is configured and adapted to separate substances of different flowability that are mixed together. The apparatus 10 comprises a frame structure 11, a hollow drum 12 which is driven in rotation and mounted on the frame structure 11 and has a perforated circumferential surface M and at least one at least partially open end side $S_V$, $S_H$, an endless press belt 13 driven in rotation which is wrapped around part of the circumferential surface M of the hollow drum 12 and can be pressed from outside against the hollow drum 12, a product intake wedge 14 formed by the press belt 13 and the hollow drum 12 for guiding into the apparatus 10 a product flow consisting of material to be pressed into the space between the hollow drum 12 and the press belt 13 in an inlet region E of the product flow, a support apparatus 15 for the press belt 13 with at least one support element 16 which is located on the side of the press belt 13 opposite the hollow drum 12, and a device 17 for discharging separation material pressed through the perforated circumferential surface M into the hollow space H of the hollow drum 12 from the at least partially open end side $S_V$, $S_H$ of the hollow drum 12.

The device 17 for discharging the separation material from the hollow drum 12 may be an integral part of the hollow drum 12 or a separate component. The end side $S_V$ of the hollow drum 12 facing the front side is open, while the opposite end side $S_H$ is preferably closed. The opening 18 shown in the rear end wall $S_H$ serves to receive or mount the hollow drum 12 on a drive shaft. The front and rear sides may also be reversed.

This apparatus 10 is characterised according to the invention in that a cooling device 19 is assigned to the hollow drum, the cooling device 19 being configured and adapted to cool the separation material during processing by means of a cryogenic cooling medium 20.

The features and further developments described below represent preferred embodiments, either individually or in combination with each other. It is expressly pointed out that features which are summarised in the description and/or the drawing or described in a common embodiment can also functionally and independently further form the apparatus 10 described above.

The frame structure 11 can be, for example, a closed or at least partially closed housing or a profile construction or similar. Preferably, the housing is substantially closed on all sides. The drive unit (not shown) for the hollow drum 12 and/or the press belt 13 is disposed on or in the frame structure 11. The drive unit may comprise a common drive or separate drive means. The rotation axis R of the hollow drum 12 runs transverse to the conveying direction F of the product flow. Holes/openings (only suggested in the Figure and not explicitly shown) are formed in the circumferential surface M of the hollow drum 12, which can be disposed in different patterns and allow the passage of parts of the product flow, in particular the easier-flowing, soft and squeezable parts, into the interior of the hollow drum 12. The hollow drum 12 is preferably provided with such openings over its entire depth or width B, which forms the working area. The press belt 13 is preferably made of an elastic material, for example rubber, polyurethane or similar, and is guided around a plurality of deflection elements 21. Preferably, a deflection element 21 is configured and adapted as a drive roller 22. Particularly preferably, the deflection element 21, which is placed downstream of the hollow drum 12 in the conveying direction F, is the drive roller 22, in order to guide the press belt 13 and thus the product flow past the hollow drum 12 with a pulling motion. Particularly preferably, the drive roller 22 is simultaneously configured and adapted as a pressure roller and/or tension roller for the press belt 13. For this purpose, the drive roller 22 is configured so as to be adjustable. The conveying of the product flow in the conveying direction F can be further supported by the hollow drum's 12 own drive.

Optionally, stripping elements can be disposed in the inlet region E, that is to say, above the product intake wedge 14, and/or in the outlet region A, that is to say, downstream of the hollow drum 12, also referred to as the perforated drum, in the conveying direction F. These stripping elements can be disposed rigidly, that is to say, at a fixed distance from the hollow drum 12 or, more precisely, from the circumferential surface M, or they can be variably controllable, that is to say, their distance from the hollow drum 12 or, more precisely, from the circumferential surface M can be varied. The hollow drum 12 and the press belt 13 can be driven at the same speed. Optionally, however, the hollow drum 12 and the press belt 13 can also be driven at different speeds. The speed difference can be controlled and/or regulated by means of a control and/or regulating device 23. The support apparatus 15 can be a support chain or a support belt. In the embodiment shown, the support apparatus 15 is configured as a roller track 24 comprising a plurality of rollers disposed one after the other in the conveying direction F of the product flow and at least partially spring-mounted.

Figure 1:
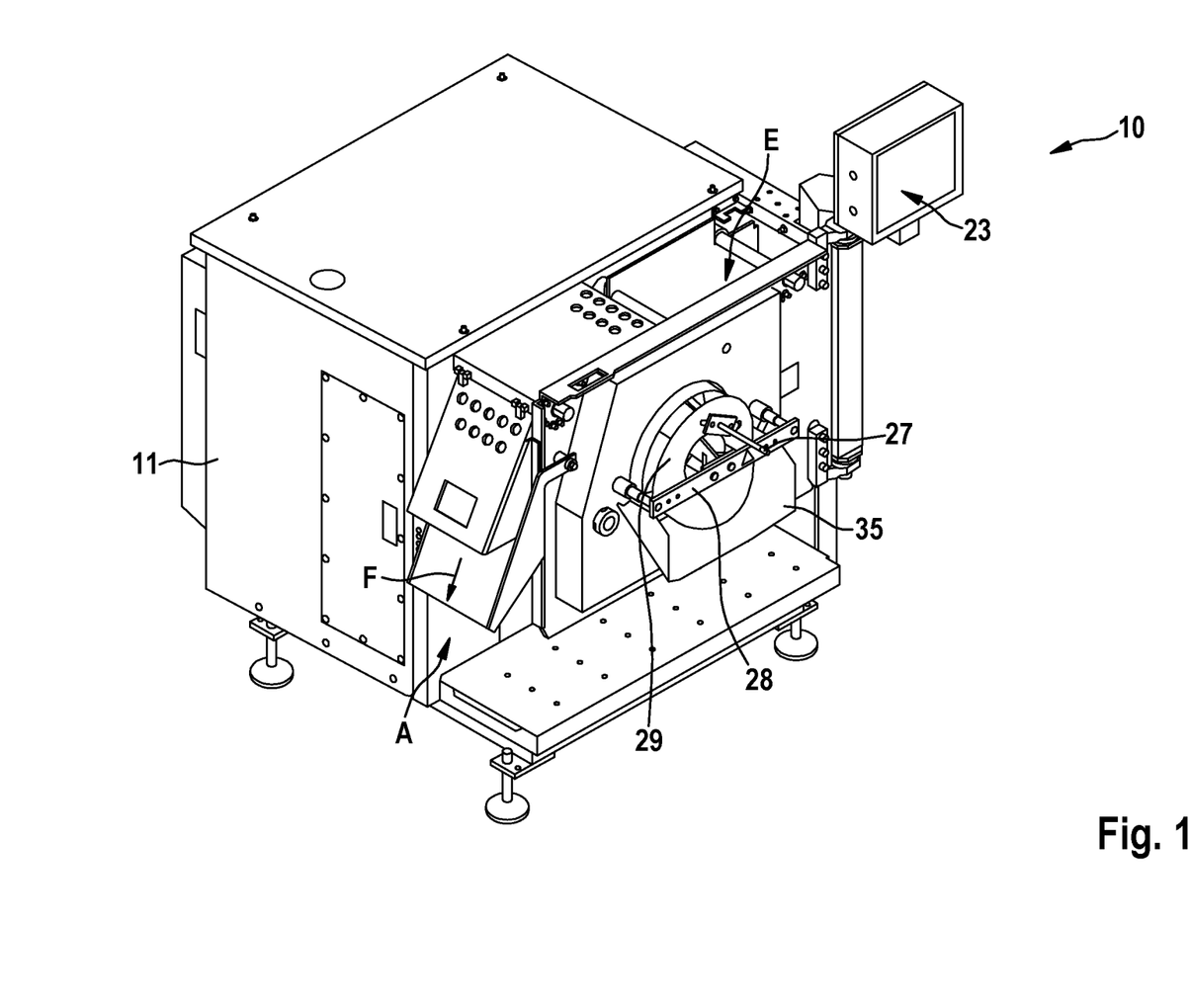
FIG. 1 A schematic representation of the apparatus according to the invention in a perspective view.

In the preferred embodiment, the cooling device 19, or at least parts thereof, is disposed in the hollow space H of the hollow drum 12 and comprises at least one nozzle 26 which is connected to a (not explicitly shown) reservoir of cooling medium 20 via a supply line 27. The supply line 27 is led out of the open end side $S_V$ of the hollow drum 12. It can be seen in FIG. 1 that a cross member 28 which is removably attached to the frame structure 11 is disposed in front of the open end side $S_V$. The supply line 27 is supported on the cross member 28, either directly or, as shown, indirectly via a form of splash protection wall 29 which at least partially covers the open end side $S_V$. The drawing shows only a single nozzle 26. Optionally, however, a plurality of nozzles 26 may also be used. Other ways of fixing, supporting or resting the nozzle 26 and/or the supply line 27 are also possible.

The or each nozzle 26 is directed towards the area of the inner surface of the hollow drum 12 approximately opposite the area of the product intake wedge 14 and/or the pressing region P adjoining it. For example, one nozzle 26 or nozzle bar may be directed—as shown—towards the area of the product intake wedge 14, while a second nozzle 26 or nozzle bar—not shown—is directed towards the pressing region P. However, the position and/or orientation of each nozzle 26 is variable and changeable. Preferably, the or each nozzle 26 is in the form of a flat spray nozzle that has a nozzle opening forming a spray fan 30, such that the cooling medium 20 emerging from the nozzle 26 is applied to the separation material pressed through the circumferential surface M in a linear fashion, extending over the entire depth/width of the hollow drum 12. In other words, the spray fan 30 preferably covers the entire working width of the hollow drum 12. However, other designs of nozzles 26 with different nozzle openings can also be used.

The or each nozzle 26 may be freely disposed in the hollow space H. The or each nozzle 26 is preferably assigned a cover 31 which at least partially covers the or each nozzle 26. The cover 31 is roof-shaped and preferably also disposed on the cross member 28. The or each nozzle 26 is disposed underneath the upwardly closed and downwardly open cover 31 so that the spray fan 30 can be formed without obstruction.

Optionally, the apparatus 10 may comprise a device (not explicitly shown) to collect and discharge the cooling medium 20 directed into the hollow space H of the hollow drum 12, which is assigned to cooling device 19. The device to collect the cooling medium 20 may comprise at least one cover hood and an exhaust fan connected to the cover hood via exhaust air pipes. The cover hood can, for example, enclose, in the sense of covering, the entire area of the open end side $S_V$ of the hollow drum 12, so as to ensure extraction of the used, at least predominantly gaseous cooling medium 20. Other designs for extracting the used cooling medium 20 from the hollow space H of the hollow drum 12 can also be used.

The or each supply line 27 for supplying the cryogenic cooling medium 20 to the or each nozzle 26 comprises a measuring and/or control section, which may be part of the apparatus 10 or of a higher-level unit. Liquid nitrogen ($LN_2$) is particularly preferred as the cryogenic cooling medium 20. In other embodiments, for example, liquid carbon dioxide ($LCO_2$) may also be used as the cryogenic cooling medium 20. The cooling media can also be used in gas form.

The separation material pressed through the circumferential surface M can be discharged from the hollow drum 12 of its own accord, solely through the rotation of the hollow drum 12. In this case the hollow drum 12 itself forms the device 17 for discharging the separation material. The device 17 for discharging the separation material preferably comprises a stripping element 32 and/or an ejection screw. The drawing shows the preferred stripping element 32, which may also be removably attached to the cross member 28. The stripping element 32 comprises a product stripping edge 33 and a product guiding surface 34, the product guiding surface 34 being shaped and/or aligned such that the separation material stripped from the inner surface of the hollow drum 12 by means of the product stripping edge 33 is guided in the direction of the open end side $S_V$ of the hollow drum 12. Other configurations of the preferably one-piece stripping element 32 and other designs for discharging the separation material from the hollow space H of the hollow drum 12 can also be used. The discharged separation material can, for example, fall onto a discharge channel 35 or similar which can optionally be cooled and is connected to a corresponding device for this purpose.

Figure 2:
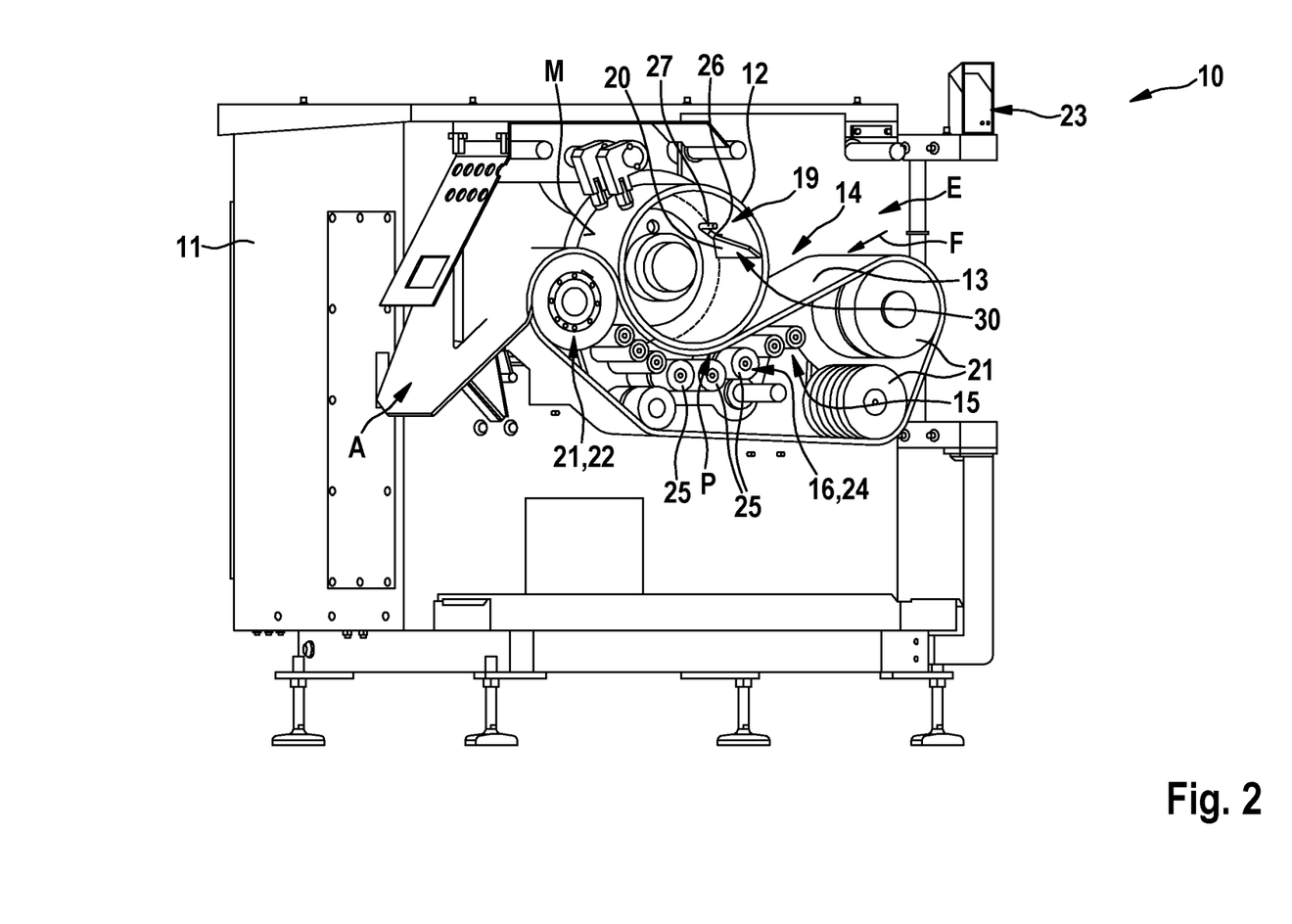
FIG. 2 A representation of the apparatus according to FIG. 1 looking into the hollow drum with the cooling device.
Figure 3:
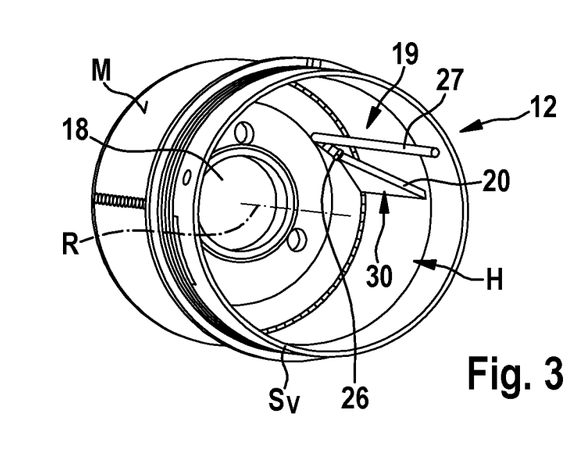
FIG. 3 The hollow drum as an individual part with a schematically shown cooling device in perspective view.
Figure 4:
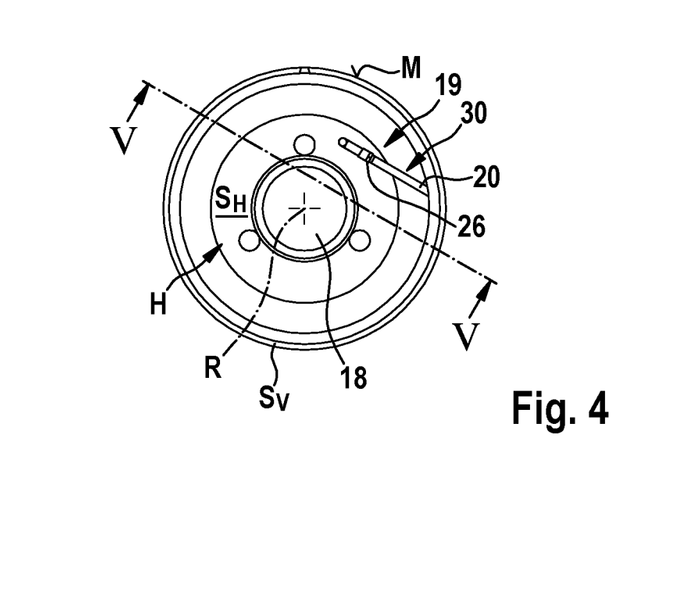
FIG. 4 The hollow drum viewed from the front looking into the open end side.
Figure 5:
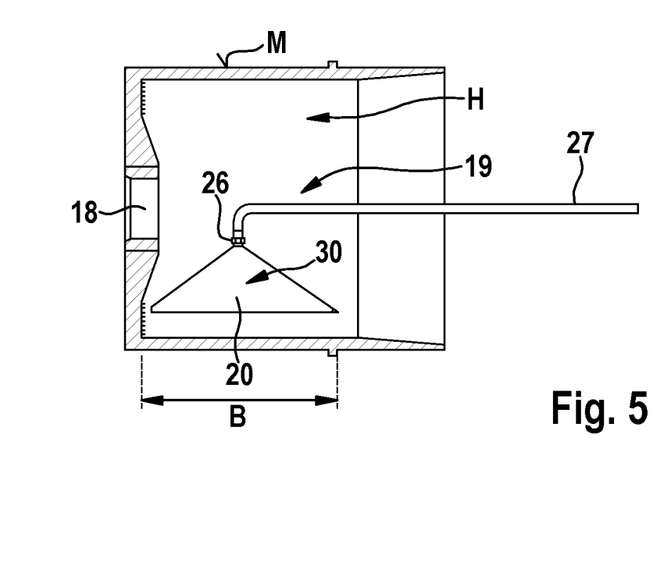
FIG. 5 The hollow drum according to FIG. 4 in section along line V-V.
Figure 6:
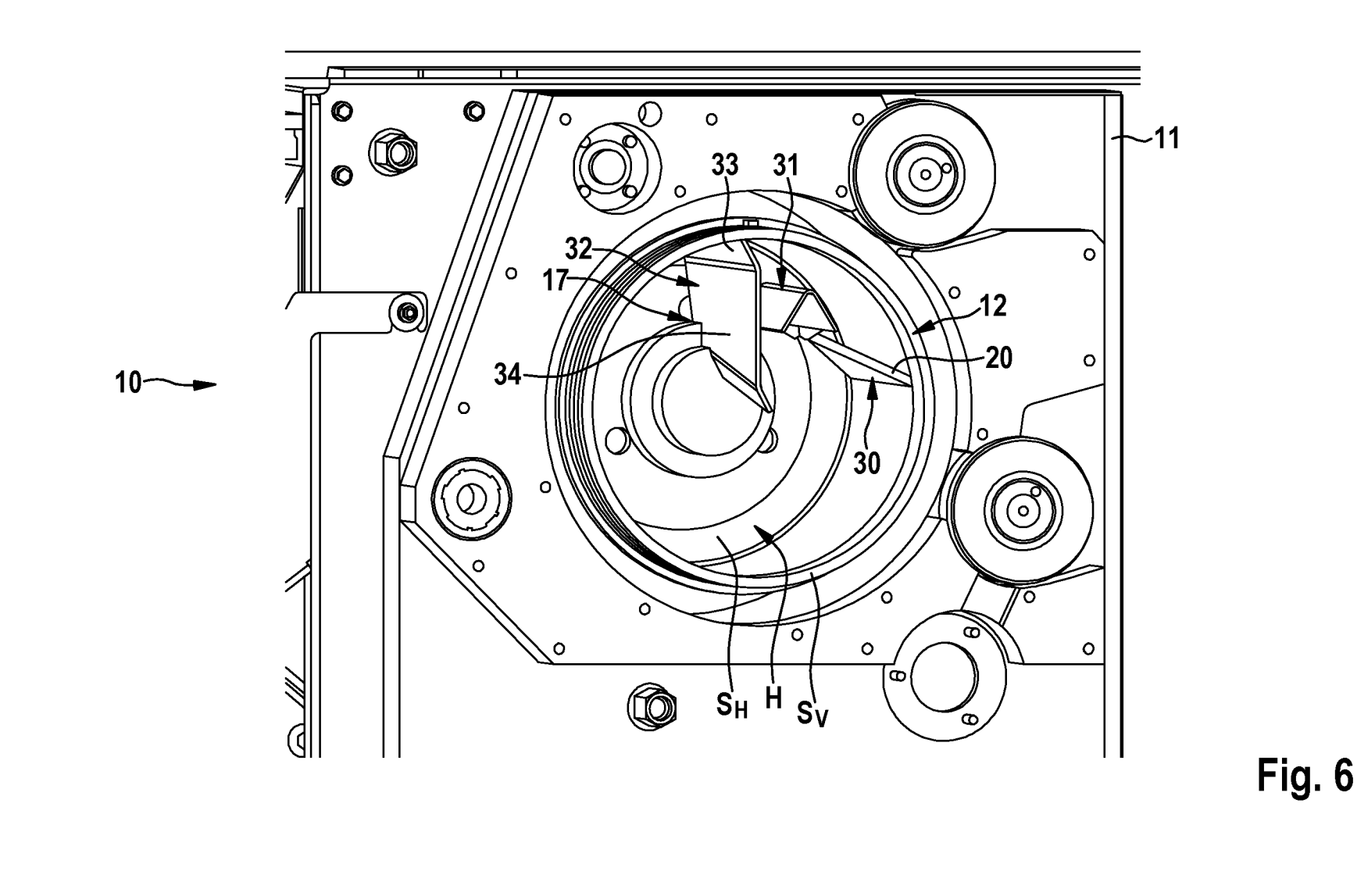
FIG. 6 A further embodiment of the hollow drum in perspective view looking into the open end side.

The method is described below in more detail with reference to the drawing. The method serves, and is accordingly configured and adapted, to separate substances of different flowability that are mixed together. First, a product flow consisting of pressed material is fed into a product intake wedge 14 formed by a hollow drum 12 with a perforated circumferential surface M and a press belt 13 which lies against the outside of the hollow drum 12 while wrapping around part of its circumference. For the separation process, the hollow drum 12 and the press belt 13 are driven in rotation to draw the product flow between the hollow drum 12 and the press belt 13. Preferably, the hollow drum 12 (in the view according to FIG. 1) is driven clockwise, while the drive roller 22 for the press belt (in the view according to FIGS. 1 and 2) is driven counterclockwise, so that the hollow drum 12 and the press belt 13 have the same conveying direction F in the area of the wraparound, that is to say, in the pressing region P, the speeds being the same as or different to each other. By transporting the product flow through the pressing region P, the easier-flowing constituents of the product flow are pressed by means of the press belt 13 as separation material through the perforation of the circumferential surface M of the hollow drum 12 into the inner hollow space H of the hollow drum 12 and discharged from an at least partially open end side $S_V$ and/or $S_H$ of the hollow drum 12, while the harder-flowing constituents of the product flow remain on the outside of the circumferential surface M of the hollow drum 12 and are discharged separately.

During separation of the product flow into its constituents, the press belt 13 is preferably supported on the side of the press belt 13 opposite to the hollow drum 12 by a support apparatus 15 comprising at least one support element 16.

According to the invention, this method is characterised in that the separation material that is pressed through the perforated circumferential surface M into the hollow space H of the hollow drum 12 is cooled in the hollow drum 12 by means of a cryogenic cooling medium 20. The separation material is directly and immediately exposed to the cryogenic cooling medium 20 during the separation process, that is to say, on being pressed through the circumferential surface M and/or on being discharged from the hollow drum 12. The cooling medium 20 is applied in a linear, fan-like or other fashion over the entire width B (corresponding to the working depth/width) of the hollow drum 12—aligned parallel to the axis of rotation R of the hollow drum 12—to the separation material that has been shredded and its surface area increased by the separation process. To cool the separation material, it is preferably supplied either with liquid nitrogen ($LN_2$) as the liquid cryogenic cooling medium 20 or with liquid carbon dioxide ($LCO_2$) as the liquid cryogenic cooling medium. However, other liquid or gaseous cryogenic cooling media 20 can also be used.

In principle, the unused cooling medium 20 can escape into the environment in gaseous form and/or in liquid form, for example, as an aerosol, vapour, mist, fumes or similar, depending on the respective cooling medium 20. The cooling medium 20 directed into the hollow space H of the hollow drum 12 is preferably collected and discharged. This can be done by suction, for example. The cooled separation material can, for example, fall out of the open end side $S_V$ of the hollow drum 12 due to the rotation of the hollow drum 12. Preferably, however, the cooled separation material is stripped from the inner surface of the hollow drum 12 and discharged from the hollow drum 12.

Particularly preferably, the desired temperature of the separation material is controlled by supplying cooling medium to the separation material. The measuring and/or control section within the supply line 27 can serve and be used for this purpose. By means of the measuring and/or control section, for example the inflow quantity, temperature, inflow speed, etc. of the cooling medium can be monitored and controlled in order to achieve an optimum cooling effect. In other words, a desired temperature can be set for optimum process control and product quality.

More particularly preferably, the method is carried out with an apparatus 10 according to one or more of claims 1 to 12.

The invention claimed is:

1. An apparatus configured to separate substances of different flowability that are mixed together, the apparatus comprising:
   a frame structure;
   a hollow drum, wherein:
   the hollow drum is driven in rotation,
   the hollow drum is mounted on the frame structure, and the hollow drum comprises a perforated circumferential surface and at least one end side, wherein the at least one end side is at least partially open;
an endless press belt driven in rotation, wherein:
the endless press belt is wrapped around a part of the perforated circumferential surface of the hollow drum, and
the endless press belt can be pressed from outside against the hollow drum;
a product intake wedge formed by the endless press belt and the hollow drum, wherein:
the product intake wedge is configured to guide a product flow into the apparatus, and
the product flow comprises material to be pressed into a space between the hollow drum and the endless press belt in an inlet region of the product flow;
a support apparatus for the press belt, the support apparatus comprising at least one support element, wherein the at least one support element is located on a side of the press belt opposite the hollow drum;
a discharging device configured to discharge separation material pressed through the perforated circumferential surface, wherein:
the discharging device comprises a stripping element and/or an ejection screw,
the separation material is pressed into a hollow space of the hollow drum, and
the separation material is pressed from the at least one end side of the hollow drum; and
a cooling device, wherein the cooling device is configured to cool the separation material during processing with a cryogenic cooling medium and is assigned to the hollow drum.

2. The apparatus of claim 1, wherein:
the cooling device is disposed in the hollow space of the hollow drum; and
the cooling device comprises at least one nozzle, wherein the at least one nozzle is connected to a reservoir of cooling medium via a supply line.

3. The apparatus of claim 2, wherein:
the at least one nozzle is directed at least towards an inner surface of the hollow drum; and
the inner surface of the hollow drum is approximately opposite the product intake wedge and/or a pressing region adjoining the product intake wedge.

4. The apparatus of claim 2, wherein:
the at least one nozzle is a flat spray nozzle; and
the flat spray nozzle comprises a nozzle opening, wherein the nozzle opening is configured to form a spray fan such that the cryogenic cooling medium emerges from the nozzle and is linearly applied to the separation material pressed through the circumferential surface, extending over an entire width of the hollow drum.

5. The apparatus of claim 2, wherein:
the at least one nozzle comprises a cover; and
the cover at least partially covers the at least one nozzle.

6. The apparatus of claim 1, further comprising a collection device to collect the cryogenic cooling medium and discharge the cryogenic cooling medium into a cavity of the hollow drum.

7. The apparatus of claim 6, wherein the collection device comprises at least one cover hood and an exhaust fan connected to the at least one cover hood via exhaust air pipes.

8. The apparatus of claim 2, wherein the supply line for supplying the cryogenic cooling medium to the at least one nozzle comprises a measuring and/or control section.

9. The apparatus of claim 1, wherein the cryogenic cooling medium is liquid nitrogen.

10. The apparatus or more of claim 1, wherein the cryogenic cooling medium is liquid carbon dioxide.

11. The apparatus of claim 1, wherein:
the stripping element comprises a product stripping edge and a product guiding surface;
the product stripping edge strips separation material from an inner surface of the hollow drum;
the product guiding surface is shaped and/or aligned such that the separation material stripped from the inner surface of the hollow drum by the product stripping edge is guided in a direction of the at least one end side of the hollow drum.

12. A method for separating substances of different flowability that are mixed together, the method comprising:
feeding a product flow, the product flow consisting of material to be pressed, into a product intake wedge, wherein:
the product intake wedge is formed by a hollow drum and a press belt, wherein the hollow drum comprises a perforated circumferential surface,
the press belt lies against an outside of the hollow drum, and
the press belt wraps around part of a circumference of the hollow drum;
driving the hollow drum and/or the press belt in rotation, wherein the rotation is configured to draw the product flow between the hollow drum and the press belt; and
pressing, by the press belt, easier-flowing constituents of the product flow as separation material:
through a perforation of the perforated circumferential surface of the hollow drum,
into a hollow space of the hollow drum, and
discharged from an at least partially open end side of the hollow drum;
wherein:
harder-flowing constituents of the product flow remain on the outside of the hollow drum;
the harder-flowing constituents of the product flow are discharged separately from the easier-flowing constituents;
the separation material that is pressed through the perforated circumferential surface into the hollow space of the hollow drum is cooled in the hollow drum by a cryogenic cooling medium; and
the separation material, after being cooled, is stripped from an inner surface of the hollow drum and discharged from the hollow drum.

13. The method of claim 12, wherein the separation material is directly and immediately exposed to the cryogenic cooling medium upon being pressed through the circumferential surface and/or on being discharged from the hollow drum.

14. The method of claim 12, wherein the cryogenic cooling medium is linearly applied over an entire width of the hollow drum to the separation material that has been shredded by the separation process.

15. The method of claim 12, wherein the cryogenic cooling medium is liquid nitrogen or liquid carbon dioxide.

16. The method of claim 12, wherein a desired temperature of the separation material is controlled by supplying the cryogenic cooling medium to the separation material.

17. The method of claim 12, wherein the cryogenic cooling medium is:
directed into the hollow space of the hollow drum; and
is collected and discharged.

18. The method of claim 12, wherein the method is carried out with an apparatus configured to separate substances of different flowability that are mixed together, the apparatus comprising:
- a frame structure;
- the hollow drum, wherein:
- the hollow drum is driven in rotation,
- the hollow drum is mounted on the frame structure, and
- the hollow drum comprises the perforated circumferential surface and the at least one end side, wherein the at least one end side is partially open;
- the press belt driven in rotation, wherein:
- the press belt is endless and wrapped around a part of the perforated circumferential surface of the hollow drum, and
- the endless press belt can be pressed from outside against the hollow drum;
- a product intake wedge formed by the endless press belt and the hollow drum, wherein:
- the product intake wedge is configured to guide the product flow into the apparatus, and
- the product flow consists of material to be pressed into a space between the hollow drum and the endless press belt in an inlet region of the product flow;
- a support apparatus for the press belt, the support apparatus comprising at least one support element, wherein the at least one support element is located on a side of the press belt opposite the hollow drum;
- a discharging device configured to discharge separation material pressed through the perforated circumferential surface, wherein:
- the separation material is pressed into a hollow space of the hollow drum, and
- the separation material is pressed from the at least one end side of the hollow drum; and
- a cooling device, wherein the cooling device is configured to cool the separation material during processing by the cryogenic cooling medium assigned to the hollow drum and is assigned to the hollow drum.

* * * * *